UNITED STATES PATENT OFFICE.

ALBERT ELIAS NIELSEN, OF CHICAGO, ILLINOIS.

PROCESS OF TREATING WASTE GASES OR VAPORS FROM SODA-CELLULOSE FACTORIES.

1,345,220.                   Specification of Letters Patent.     Patented June 29, 1920.

No Drawing.          Application filed January 13, 1919. Serial No. 270,987.

*To all whom it may concern:*

Be it known that I, ALBERT ELIAS NIELSEN, a subject of the King of Norway, residing at Chicago, Cook county, Illinois, United States of America, have invented certain new and useful Improvements in Processes of Treating Waste Gases or Vapors from Soda-Cellulose Factories; and I do hereby declare the following to be a full, clear, and exact description of the invention, such as will enable others skilled in the art to which it appertains to make and use the same.

This invention relates to the treatment of such waste gases and vapors, as are obtained in the manufacture of cellulose according to the soda or sulfate process, and has for its object a method of treating the gases so as to improve their odor and to recover useful products therefrom.

It is a well known fact that the waste gases from sulfate cellulose factories have an extremely bad odor such factories being for this reason a great nuisance to their environments. Serious attempts have therefore been made to destroy or retain the malodorous constituents of the said gases. As far as known however these attempts have not hitherto led to any satisfactory result.

According to the present invention the gases and vapors escaping from the apparatuses of sulfate cellulose factories are subjected to a treatment which removes from the gases the malodorous substances and at the same time valuable constituents of the same such as the large quantities of volatilized sodium compounds contained therein are recovered.

This is brought about by subjecting the gases to a basic absorption mass which may consist of slaked or unslaked lime or calcium carbonate together with some alkali. An absorption mass particularly useful for the purpose consists in the "greenlime" ("mesa") obtained as a waste product in sulfate cellulose factories. This greenlime, which is obtained by the causticizing of the dissolved "melt" from the soda furnace with burned lime and which substantially consists of precipitated $CaCO_3$ together with some few per cent. of sodium compounds (principally sodium carbonate and caustic soda) is now according to the present invention employed for the treatment of the exhaust gases from the digesters as well as of the vapors from the evaporation of the "black liquor" and the gases from the melting furnaces.

When using the "greenlime" for the purpose in question the process is advantageously carried into effect by introducing the greenlime into the gas current from the melting furnaces and the evaporators with which has been mixed also the gases from the digesters, provision being of course made for causing an intimate contact between the gases and the lime mass, so as to provide the best possible conditions for the physical absorption and the chemical reactions to take place.

By the action of the gases upon the greenlime a plurality of different substances are taken up in this latter. By analysis of greenlime subsequent to the absorption the following substances among others have been found: $Na_2CO_3$, $Na_2S$, $Na_2SO_4$, $Na_2S_2O_3$, $Na_2SO_3$, $H_2S$, $CNSR$, in which $R$ represents an organic radical, $NaCNS$, acetone and other ketones as well as aldehydes and mercaptans. The original content of calcium carbonate in the "greenlime" is moreover by the treatment converted into other substances by the constituents of the gases. Thus in the treated "greenlime" the following substances have also been found: $CaSO_3$, $CaSO_4$, $CaS$, $CaO$, $CaS_2O_4$, $CaC_2$, etc.

From the used absorption mass the various constituents may then be recovered or the mass may be used as such for different purposes.

Thus the absorption mass, *i. e.*, the "greenlime" after treatment with the gases as above described, is transferred to a closed causticizing vessel containing the concentrated soda solution from the lixiviation towers, as hereinafter set forth, and quick lime at least sufficient to boil the mixture and place it under pressure is added. The combined volatile constituents are then expelled and can be collected in special absorption chambers from which they may be removed in a more concentrated condition. By means of compression some of the constituents may then be separated. The new greenlime precipitate produced by the causticizing of the soda solution with the absorption mass and lime may then anew be employed in the absorption apparatus. By the described causticizing in closed vessels it is attained, besides other advantages, that the calcium thiosulfate is converted into the more valuable sodium thiosulfate, such conversion being effected with advantage simply by boiling.

The treatment with the absorption mass referred to may advantageously be combined with the utilization of the heat content of the gases and vapors. The heat may be utilized to effect the heating of solutions and other liquids by passing the hot gases in direct contact with the latter for instance during the solution of the soda bearing "melt" obtained by the evaporation and combustion of the black lye and for preheating the water necessary in this solution operation and for other purposes. By this means useful substances such as sodium compounds contained in the gases and also the malodorous constituents of the same are in part removed from the gases. Subsequent to this treatment the gases may be passed over "greenlime" and after having been freed from their content of carbon dioxid the gases may be introduced into the melting furnaces or treated by compression to be freed from the remaining content of malodorous and it may be also of useful substances.

The process may for instance be carried into effect in the following manner.

The mixed gases and vapors are introduced at the bottom of a tower filled with pieces of hot black ash "melt" and charged from above with water or dilute soda solution. This liquid becomes heated by the ascending hot gases, effects the lixiviation of the melt, and is withdrawn as a concentrated soda solution at the bottom of the tower. Instead of a single lixiviation tower a plurality of such towers may be employed. The towers may then be arranged in series, so that the soda solution withdrawn from one tower is supplied to the top of the next tower of the series, in order to be further concentrated. Series of towers arranged in parallel may also be used.

The gases from the lixiviation tower or from the last tower in the series when a plurality of towers is made use of are then introduced into one or more scrubbers without melt filling in which they are washed with a counter current of water, which then becomes heated by the still hot gases. The scrubbers may also be arranged in series and the water is passed in counter current to the gas from one tower to the other, the last tower in the series being then supplied with pure water. In the scrubbers more hot water may be obtained than what is needed in the lixiviation towers, the supply of the water to these latter being necessarily controlled with the object in view to obtain a suitable concentration of the soda solution. This excess quantity of hot water may be employed in washing the diffusers, the causticizing vessels, the greenlime filters and other apparatus of the factory.

The gases from the systems of towers may then be treated with greenlime as above described.

The concentrated soda solution from the lixiviation towers is passed to the causticizing vessel where it is causticized with lime. The greenlime from the absorption apparatus is also introduced into the closed causticizing vessel where the causticizing operation takes place under pressure by the addition of sufficient lime. When the causticizing is completed the gases as well as the volatile substances which have been taken up in the "greenlime" are expelled from the soda solution. The so obtained concentrated gases may then be utilized by means of distillation and compression. The transmission of washing liquid from one tower to the other may be effected by a centrifugal pump or by any other known means.

The gas after having passed through will principally consist of air and some carbon dioxid as well as other gases. It may be further treated either by being freed from carbon dioxid in apparatus adapted for this purpose and then introduced into the melting furnaces. These gases which may contain acetylene, sulfurous and carbonaceous gases, turpentine oil, mercaptans, aldehydes and ketones, are fed together with air into the furnace to produce a more lively combustion of the "black ash" in the furnace. Thus any residues of malodors are absorbed in the "black ash," the remainder escaping to the atmosphere free from objectionable odor. Or it may be subjected to compression so as to effect the deposition of the remainder of malodorous and it may be also useful substances. After causticizing the lye may be subjected to elutriation and finished causticized lye may then be withdrawn. When washed the greenlime may then be passed into a filter.

I claim:

1. The process, which comprises reacting upon a mass containing free lime with the waste gas from the soda cellulose process, thereby forming compounds of calcium containing carbon and compounds of calcium containing sulfur and absorbing organic compounds of calcium.

2. The process, which comprises reacting upon a mass containing free lime and an alkaline sodium compound with the waste gas from soda cellulose processes, thereby forming salts containing sodium and sulfur, and compounds containing calcium and sulfur, and absorbing ketones, aldehydes, mercaptans, acetone, as well as other gaseous compounds.

3. Process of treating waste gases or vapors from soda cellulose factories comprising the step of subjecting the gases or vapors to the action of an absorption mass comprising the "greenlime" obtained as a by product in soda cellulose factories.

4. Process of treating waste gases or vapors from soda cellulose factories comprising the step of subjecting the gases or vapors to the action of an absorption mass containing lime, the absorption mass being thereupon utilized in forming soda solutions.

5. Process of treating waste gases or vapors from soda cellulose factories comprising the step of subjecting the gases or vapors to the action of an absorption mass containing lime, the absorption mass being thereupon utilized in forming soda solutions, the said causticizing being effected in closed vessels at boiling temperatures.

6. Process of treating waste gases or vapors from soda cellulose factories comprising the step of subjecting the gases or vapors to the action of an absorption mass containing lime, the absorption mass being thereupon utilized in forming soda solutions, the said causticizing being effected in closed vessels at boiling temperatures and the expelled volatile substances being collected.

7. Process of treating waste gases from soda cellulose factories comprising in combination the steps of passing the gases or vapors in direct contact with liquids to be heated and of subjecting the gases or vapors to the action of a basic absorption mass comprising greenlime.

8. Process according to claim 6 in which the gases previously to their being treated with the absorption mass are passed in contact with an aqueous liquid flowing through a layer of pieces of black ash "melt."

9. The process of treating waste gases or vapors from soda cellulose factories, comprising subjecting the gases or vapors to the action of an absorption mass containing free lime and thereafter supplying them for the combustion of the black ash in a suitable furnace.

10. Process for treating gases or vapors from soda cellulose factories, which comprises first reacting upon "greenlime" with such gases and then reacting with the residue of such gases on "black ash" during the furnace treatment of the latter and in the presence of air.

In testimony that I claim the foregoing as my invention I have signed my name.

ALBERT ELIAS NIELSEN.